US009573167B2

(12) United States Patent
Marrapodi et al.

(10) Patent No.: US 9,573,167 B2
(45) Date of Patent: Feb. 21, 2017

(54) MACHINE FOR COLLECTING AND SORTING WASTE (75) Inventors: Stéphane Marrapodi, Paris (FR); Benoît Paget, Paris (FR)

(73) Assignee: CANIBAL, Gennevilliers (FR)

( * ) Notice: Subject to any disclaimer, the term of this patent is extended or adjusted under 35 U.S.C. 154(b) by 535 days.

(21) Appl. No.: 13/810,989

(22) PCT Filed: Jul. 7, 2011

(86) PCT No.: PCT/EP2011/061541
§ 371 (c)(1),
(2), (4) Date: Apr. 1, 2013

(87) PCT Pub. No.: WO2012/010434
PCT Pub. Date: Jan. 26, 2012

(65) Prior Publication Data
US 2013/0180892 A1 Jul. 18, 2013

(30) Foreign Application Priority Data

Jul. 19, 2010 (FR) ..................................... 10 55872

(51) Int. Cl.
*B07C 5/34* (2006.01)
*B65F 1/00* (2006.01)
(52) U.S. Cl.
CPC ............... *B07C 5/34* (2013.01); *B07C 5/3412* (2013.01); *B65F 1/0033* (2013.01);
(Continued)
(58) Field of Classification Search
CPC ........ B07C 5/34; B07C 5/3412; B07C 5/3404;
B07C 5/3408; B65F 2240/00; B65F 2240/112; B65F 2240/1123; B65F 2240/12; B65F 2240/1126
(Continued)

(56) References Cited

U.S. PATENT DOCUMENTS 4,919,799 A * 4/1990 Menardi et al. .............. 209/538
5,174,454 A * 12/1992 Parkander ...................... 209/3.3
5,465,822 A * 11/1995 DeWoolfson et al. ........ 209/930

FOREIGN PATENT DOCUMENTS

BE 1 009 279 A3 1/1997
EP 0 684 191 A1 11/1995
(Continued)

*Primary Examiner* — Joseph C Rodriguez
*Assistant Examiner* — Kalyanavenkateshware Kumar
(74) *Attorney, Agent, or Firm* — Sughrue Mion, PLLC (57) ABSTRACT The invention concerns a machine for collecting and sorting waste comprising a frame (2) with a base (3) resting on the floor and a front face (5) in which an opening (7) is made, allowing access to a waste insertion zone (8), the machine further comprising, inside the frame (2), means (50) of recognizing waste, a waste sorter (40) and means (20, 23) of storing sorted waste comprising at least two containers (20), the machine comprising:
  an elevator (15) for transporting a waste item inserted into the insertion zone (8), towards the sorter (40) disposed vertically above the insertion zone (8), and
  the waste sorter (40) being arranged so as to move the transported waste vertically above a container (20), selected according to information furnished by waste recognition means (50), and in which the waste is received.

The machine can also comprise means for compacting waste.

18 Claims, 7 Drawing Sheets

(52) U.S. Cl.
CPC ... *B65F 2210/162* (2013.01); *B65F 2210/164* (2013.01); *B65F 2240/1126* (2013.01); *B65F 2240/12* (2013.01); *Y02W 30/10* (2015.05)

(58) Field of Classification Search
USPC .................................. 209/10, 552, 583, 597
See application file for complete search history.

(56) References Cited

FOREIGN PATENT DOCUMENTS

| | | |
|---|---|---|
| WO | 99/43579 A1 | 9/1999 |
| WO | 2006/089990 A1 | 8/2006 |

\* cited by examiner

MACHINE FOR COLLECTING AND SORTING WASTE

BACKGROUND OF THE INVENTION

The present invention concerns a machine for collecting and sorting waste, and more particularly a machine with a small footprint, making it possible to collect a large volume of waste.

In an ecological and societal contribution, the recycling of household waste has become common practice. However, it is more difficult to recycle waste outside the home, because the collection of this waste requires a large infrastructure.

Thus, it is particularly difficult to collect and sort waste from machines dispensing hot or cold drinks. Indeed, these machines deliver different types of drinks, the contents of which must be selectively sorted, stored and recycled. This requires waste containers that are specific to each type of waste, collection means that are close to the dispensers, and regular collection. The collection of waste produced by automatic dispensers is therefore more difficult than the collection of household waste.

Metal cans, plastic bottles and plastic cups are the most commonly used containers in automatic dispensers. There are known devices for sorting and storing waste of this type. In particular, the document FR2829950 describes an automatic waste-compacting and sorting machine. This machine comprises a compression shaft for compacting and moving the waste and sensors for detecting the type of waste (steel, aluminum or plastic) as well as means for directing the waste towards the respective containers.

However, such a machine occupies a large surface area on the floor. It is therefore difficult to place it in confined spaces such as an employees' lounge.

OBJECT OF THE INVENTION

The purpose of the invention is to propose a machine enabling the aforementioned disadvantages to be at least partly resolved.

BRIEF DESCRIPTION OF THE INVENTION

To that end, a machine is proposed for collecting and sorting waste comprising a frame with a base resting on the floor and a front face in which an opening is made, allowing access to a waste insertion zone (8), the machine further comprising, inside the frame, means of recognizing waste, a waste sorter and means of storing sorted waste comprising at least two containers. According to the invention:
- the machine comprises an elevator for transporting waste, inserted into the insertion zone, towards the sorter disposed vertically above the insertion zone,
- the waste sorter is arranged so as to move the transported waste vertically above a container, selected according to information furnished by waste recognition means, and into which the waste is received.

By means of the elevator, the storage means can be arranged in a vertical disposition, which makes it possible to minimize the surface area beneath the machine.

Advantageously, the waste storage means comprise an individual trapdoor for each container, separating the container from a temporary storage zone situated above the trapdoor.

Thus, the storage of waste is not limited just to the capacity of the containers, and the filling of one of the containers does not prevent the machine from functioning. Indeed, if the container is filled, the trapdoor is simply closed so that the waste piles up above the closed trapdoor in the respective temporary storage zone. The container can then be removed and replaced by another container. The trapdoor is then opened and the waste that had fallen onto the trapdoor is then collected in the new container.

BRIEF DESCRIPTION OF THE DRAWINGS

The invention will be better understood from the description with reference to the appended drawings provided by way of non-limiting example, in which.

DETAILED DESCRIPTION OF THE INVENTION

The idea on which the invention is based is to produce a machine, the components of which are placed vertically above each other in order to reduce the floor surface area occupied by the machine.

Figure 1:
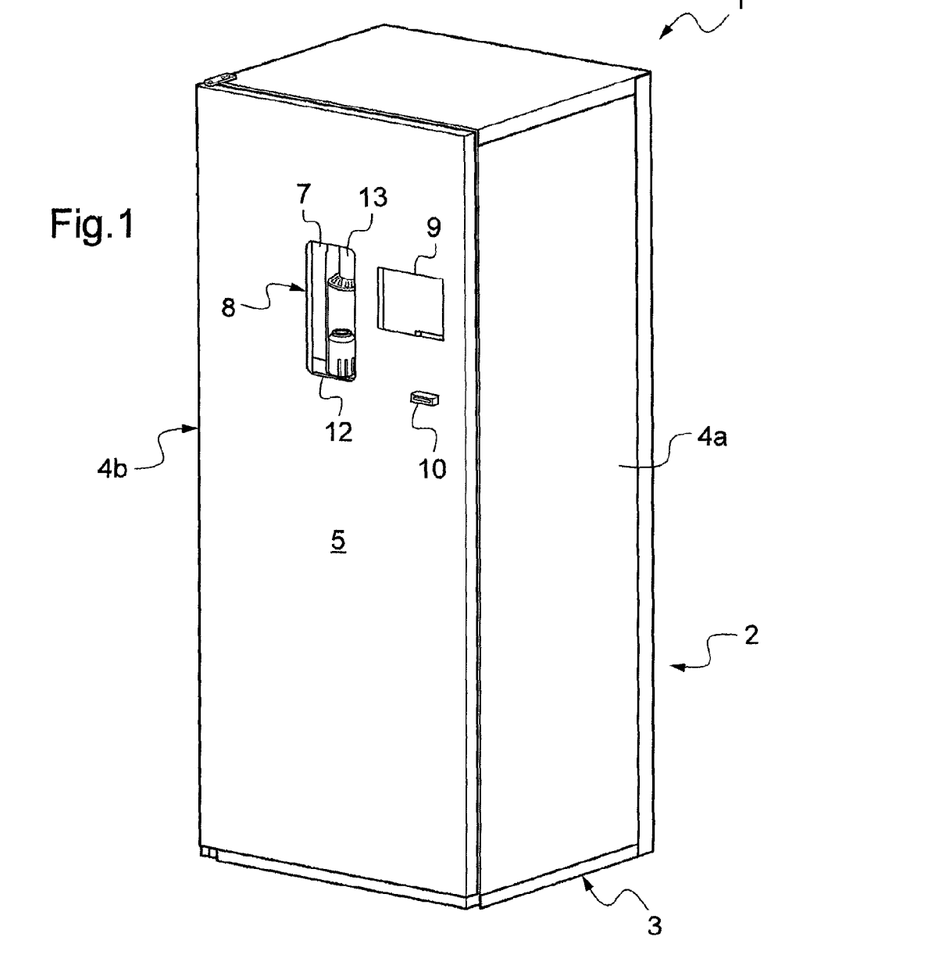
FIG. 1 illustrates a view in perspective of a machine according to the invention.

With reference to FIG. 1, the machine 1 has a parallelepiped frame 2. The frame 2 rests on a base 3 having a small surface area on the floor. The frame 2 also has side faces 4a and 4b, a back face (not shown) and a front face 5, which includes an opening 7 giving access to the waste insertion zone 8. The front face 5 comprises a digital screen 9 providing information to the user and a printer 10 that issues rewards, in this instance bonus coupons. Advantageously, the front face 5 forms a pivoting door allowing access to the interior of the machine 1. The opening 7 is closed by a sliding trapdoor (not shown) actuated by the user. In the figure, a can be seen inside the waste insertion zone 8.

The device illustrated here is designed to sort three types of waste: metal cans, 50-centiliter polyethylene terephthalate bottles and plastic cups.

Figure 2:
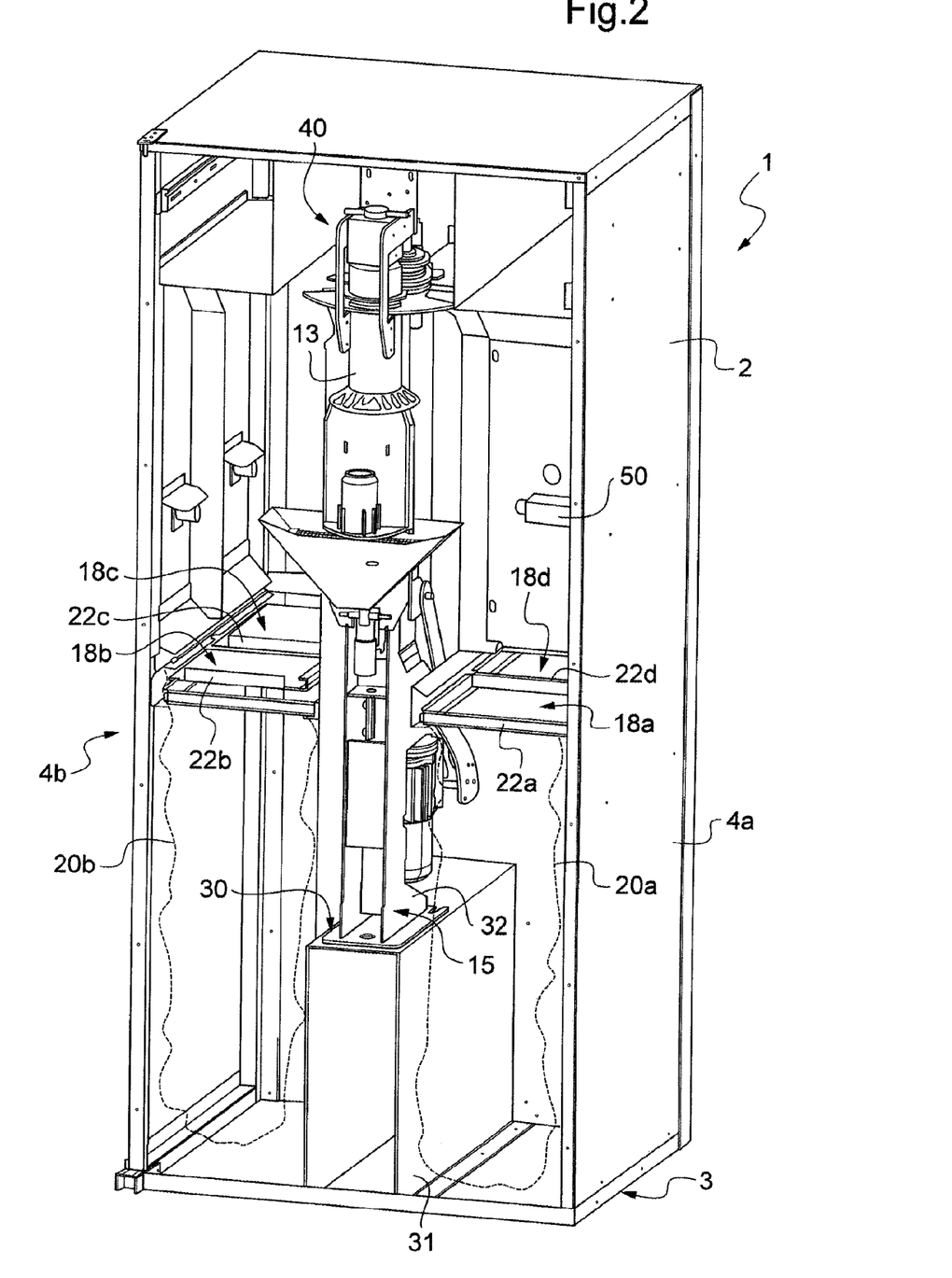
FIG. 2 illustrates a similar view to that of FIG. 1, with the front face removed.

FIG. 2 illustrates the interior of the machine 1, the front face 5a of which has been removed. The machine 1 comprises an elevator 15 and a waste sorter 40 located at equal distance from the side walls 4a and 4b, while separating the volume of the frame 2 into two parts. Disposed on either side of the elevator 15 and the sorter 40 are the storage means that occupy the major part of the volume of the frame.

According to one particular arrangement, the storage means thus comprise four locations 18a, 18b, 18c and 18d, each of which can receive a container 20a, 20b, 20c, 20d, in this instance garbage bags symbolized by dotted [sic] lines. Each of the containers 20a, 20b, 20c is intended to receive a particular type of waste to be stored: metal can, plastic bottle or plastic cup. The fourth container 20d (which extends behind the container 20a) in this instance is a buffer container intended to receive the waste for which the corresponding container is already full. For example, when the machine 1 is placed beside a dispenser of hot drinks served in cups, the container 20c (which extends behind the container 20b) intended for the cups will fill more quickly than the other containers. When the cup container 20c is full, the machine will then deposit the cups in the buffer container 20d.

The containers 20a . . . 20d are closed by retractable trapdoors 22a to 22d (only two trapdoors are represented in the closed position in the left part of FIG. 2) articulated on the side walls 4a and 4b and making it possible to separate the containers 20a . . . 20d from temporary storage volumes 23a . . . 23d located above the containers 20a . . . 20d. The temporary storage volumes 23a . . . 23d are bounded by separation walls 24 located on each side of the elevator and arranged to produce four temporary storage volumes 23a . . . 23d extending vertically above the containers. Thus, when a container 20 is full, the corresponding trapdoor 22 closes and isolates the container 20. It is therefore possible to empty the container 20, full but not overflowing with waste, for example through openings made in the side panels or in the rear panel, or simply by opening the front face 5. Once the container 20 is full and the corresponding trapdoor 22 is closed, the waste accumulates in the buffer container 20d or in the associated temporary storage volume 23, above the corresponding trapdoor, so that the already-full container 20 is not saturated.

The trapdoors 22a . . . 22d are held vertically by electromagnets 25 located on the side walls 4a and 4b. When a container 20 is full, power is shut off to the respective electromagnet 25 and the trapdoor 22 falls. Once the container 20 has been emptied and put back in place, the trapdoor 22 is raised manually and power is supplied to the electromagnets 25. Thus, the waste stored in the temporary storage volume vertically above the empty container again falls into [the] container.

Figure 2A:
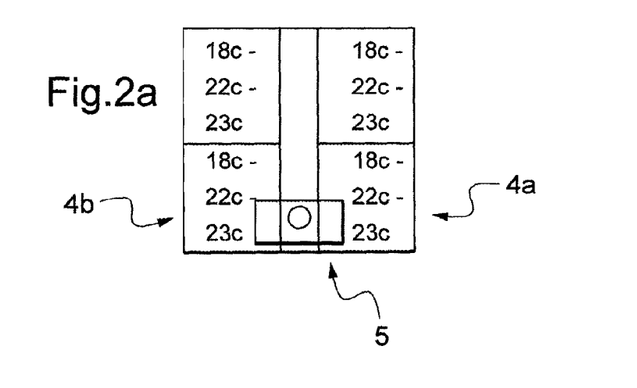
FIG. 2a is a diagrammatic top view of the machine, showing the arrangement of the waste reception containers.

FIG. 2a diagrammatically illustrates the arrangement of the containers, trapdoors and temporary storage zones.

The storage means 17 further comprise sensors, such as mass sensors, making it possible to control the filling of the containers 20.

The containers 20 and the temporary storage zones 23 are arranged to be higher than they are wide in order to offer the smallest possible surface area on the floor. Because of this arrangement, the elevator 15 must take the waste from the height of the opening up to the sorter 40 located above the temporary storage volumes 23, which is a considerable height, greater than the cumulative height of the containers 20 and the temporary storage volumes 23.

Figure 3:
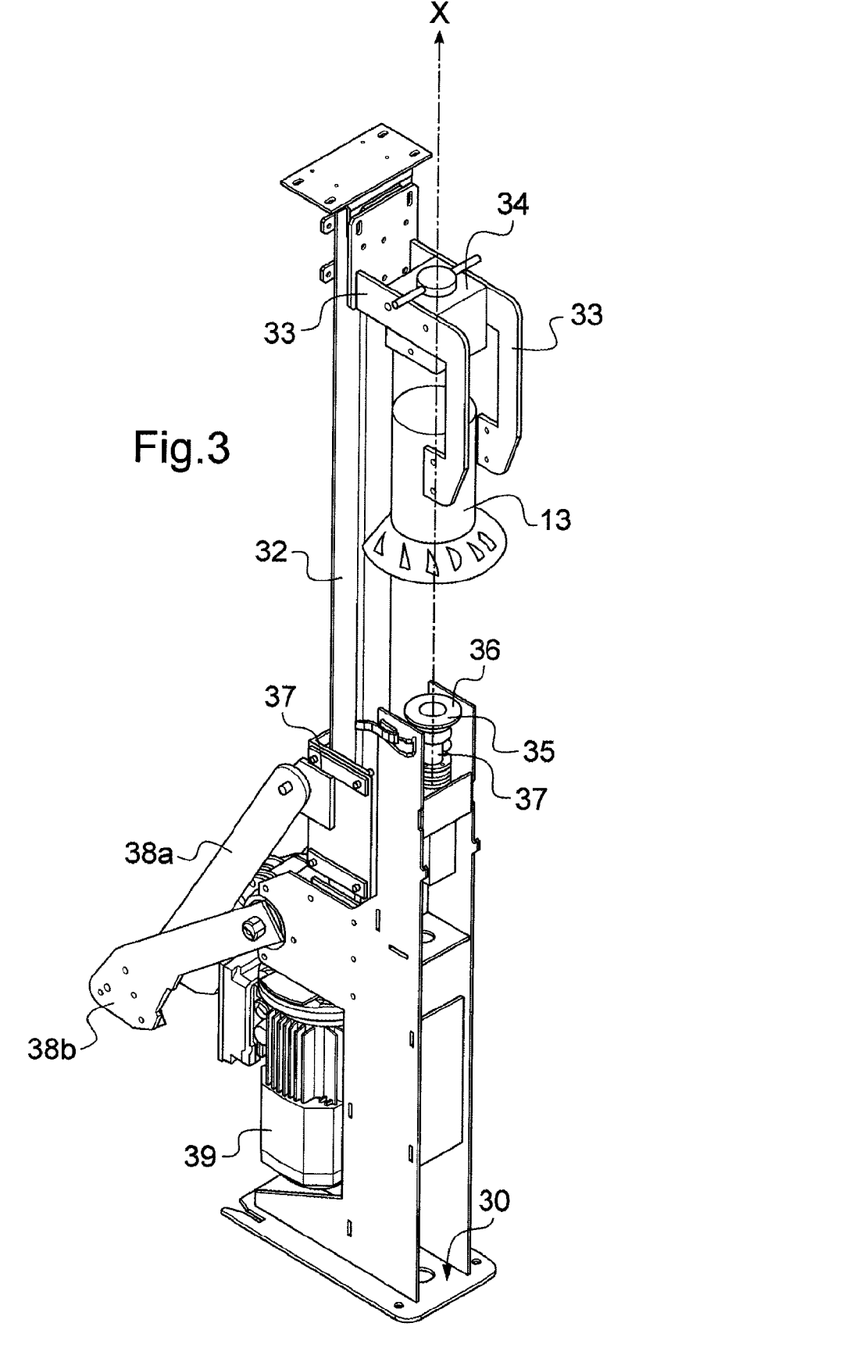
FIG. 3 illustrates a detailed view of the elevator shown in FIG. 2.

Thus, as illustrated in FIGS. 2 and 3, the elevator 15 has a fixed part comprising a mounting plate 30, which rests on a pedestal 31 fixed to the base 3 of the machine 1, the mounting plate 30 having two panels that extend to have a column 32 fixed to the mounting plate 30 and which extends substantially up to the top of the device. The column 32 is terminated by mounting brackets 33, which support a hollow cylindrical guide 13 fitted with an intake cone, the base of which faces downwards.

The elevator 15 also comprises a movable part comprising a platform 36 secured to a slide 37 mounted slidably along the rod 32. The platform 36 comprises a disk 35 on which the waste rests that is inserted by the user into the device. The slide 37 is driven in reversible vertical translation movement by a rod/crank system 38a/38b actuated by an electric motor 39 secured to the mounting plate 30.

The machine 1 also comprises a stop 34 disposed on the mounting brackets 33 and allowing the elevator 15 to compact the waste by crushing it against the stop 34. Thus, the volume of the waste is reduced, which makes it possible to increase the number of waste items that can be stored by the machine 1.

The platform 36, the guide 13 and the stop 34 are aligned in such a way that a waste item placed on the platform 36 is moved through the guide 13 to be crushed against the stop 34.

Figure 4:
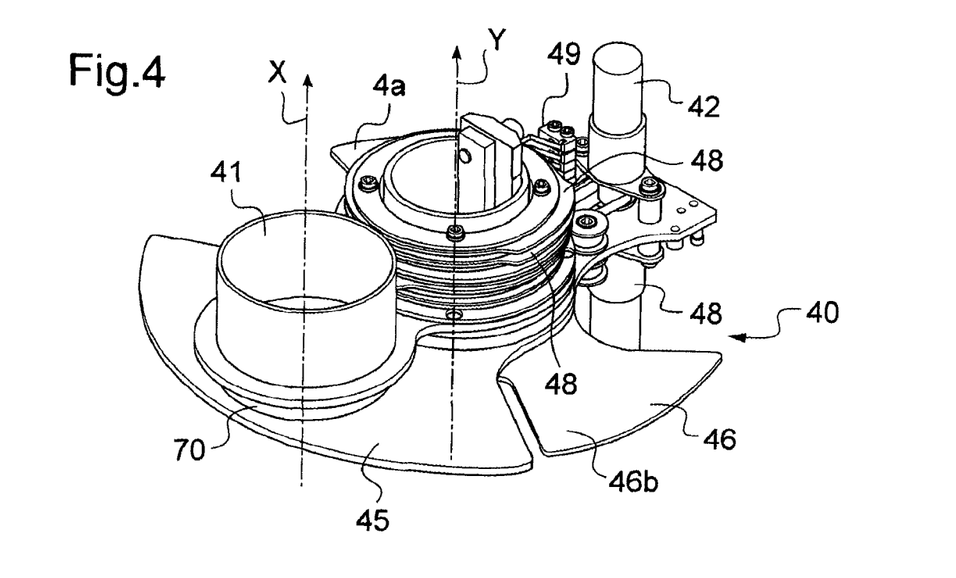
FIGS. 4 and 5 illustrate respectively a detailed view in perspective and a top view of the sorter shown in FIG. 2.

The sorter 40 will now be described in detail in relation to FIGS. 4 and 5.

The sorter 40 makes it possible to selectively move the waste items, taken by the elevator 15, to vertically above the appropriate container 20a . . . 20d. To that end, the sorter 40 comprises a movable receptacle 41 with a diameter greater than the diameter of a waste item. In the standby position, the center of the receptacle 41 is aligned with the sliding axis X of the platform 36 so that the waste item carried by said platform can enter it and be held there completely.

The sorter 40 also comprises a fixed, horizontal transfer plate 45, overall sector [sic] in shape, disposed beneath the receptacle 41. The transfer plate 45 has an orifice 70 allowing the passage of the waste item and of the platform 36 through the transfer plate 45.

Figure 5:
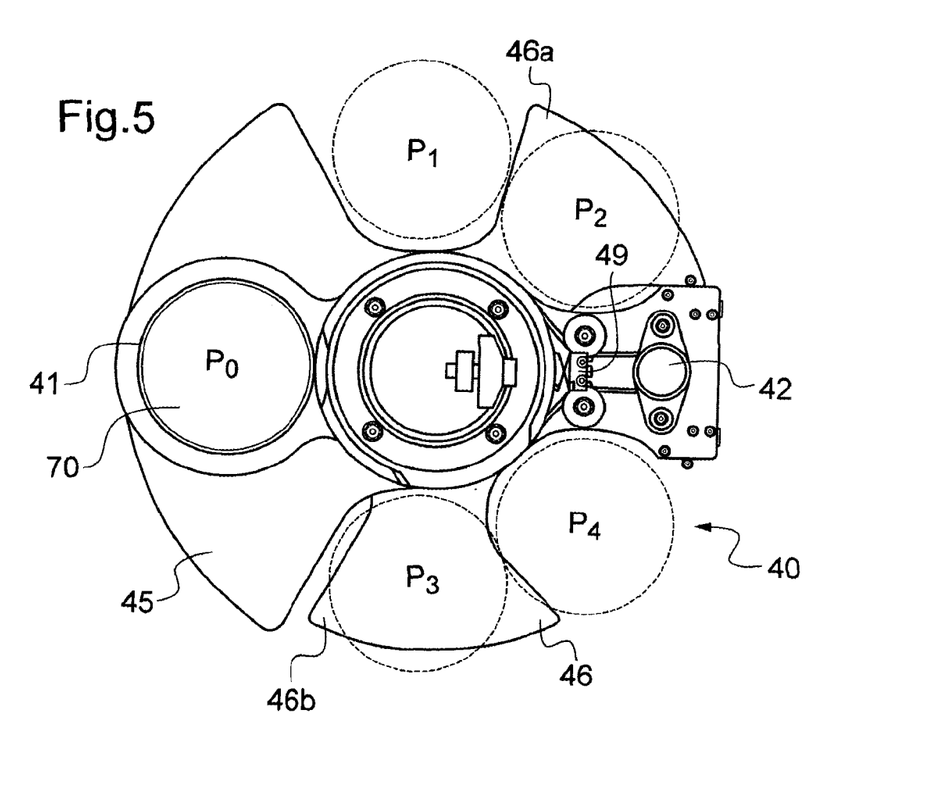

The receptacle 41 is mounted to pivot, parallel to the fixed plate, around a vertical axis Y by means of a motor 42, which allows the receptacle 41 to take five different positions represented in dotted lines in FIG. 5: the position P0 corresponds to the receiving position of the waste items carried by the platform 36. Each of the positions P1 to P4 corresponds to a position directly above one of the containers.

The sorter 40 also comprises a movable plate 46 pivoting parallel to the transfer plate 45 around the axis Y, by means of a plate motor 47, between two positions. The movable plate 46 is disposed beneath the transfer plate 45 in such a way as to extend the ends of the latter. The movable plate 46 forms a first blade 46a and a second blade 46b extending from each side of the sorter 40 and which enable the fixed plate 45 to be extended in order to take the waste items towards the position P2 or P4, i.e., towards the containers disposed against the rear face of the machine 1. The blades 46a and 46b are arranged so that in a first position of the movable plate 46, the first blade 46a extends facing the position P2 and the second blade 46b extends facing the position P3. In a second position of the movable plate, the first blade 46a extends facing the position P1 while the second blade 46b extends facing the position P4.

Thus, to deposit a waste item in the container 20d corresponding to the position P4, the movable plate 46 must be positioned in the first position and the receptacle 41 must be moved to P4. To do this, the platform 36 of the elevator 15 takes the waste item to position P0 at the transfer plate 45, the waste item entering into the receptacle 41. Said receptacle 41 is then moved and it drags the waste item, which slides on the transfer plate 45. Said transfer plate slides on the blade 46b of the movable plate 46 and continues to be dragged by the receptacle 41 to the position P4, where it falls into the container 20d. Obviously, the same method is used to drop the waste item into any of the other containers.

The sorter 40 also comprises means that make it possible to control the position of the receptacle 41 and of the movable plate 46. To that end, the receptacle 41 is connected to five cams 48, each corresponding to a position P0 to P4, the movable plate 46 being connected to a sixth cam 48.

Each of the six cams 48 activates a contactor 49. Thus, depending on the activation of the contactors 49, it is possible to control the position of the receptacle 41 and of the movable plate 46.

The sorter 40 is arranged in the machine 1 between the guide 13, inside which the platform 36 moves, and the stop 34. In order to compact the waste item, the platform 36 moves through the transfer plate 45 and the receptacle to crush the waste item against the stop 34. After compacting the waste item, the platform 36 descends to a position in which the disk 35 is flush with the transfer plate 45.

The machine of the invention comprises means of recognizing waste items comprising a CCD camera 50 (FIG. 2), the images from which are analyzed by a shape recognition program making it possible to distinguish recyclable waste items from non-recyclable waste items. Thus, it is possible to distinguish cans, bottles and cups, and to be able to refuse to process non-recyclable waste items (food, packaging, etc.) by the machine 1. The camera 50 is preferably placed in a plane that includes the axis X in order to offer a side view of the waste items.

The shape recognition program comprises a database listing the types of acceptable waste items in the device as well as the average weight associated with each waste item. For example, the shape recognition can be done by estimating for each container a ratio between a total height of the waste item and an outside diameter thereof.

Figure 6:
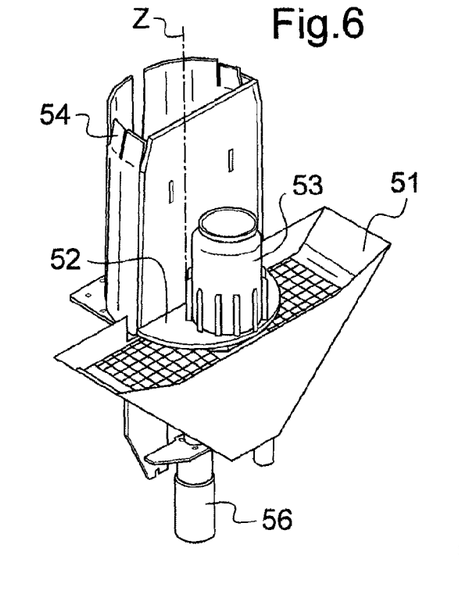
FIGS. 6 and 7 illustrate respectively a detailed perspective and side views of the insertion zone shown in FIG. 2.
Figure 7:
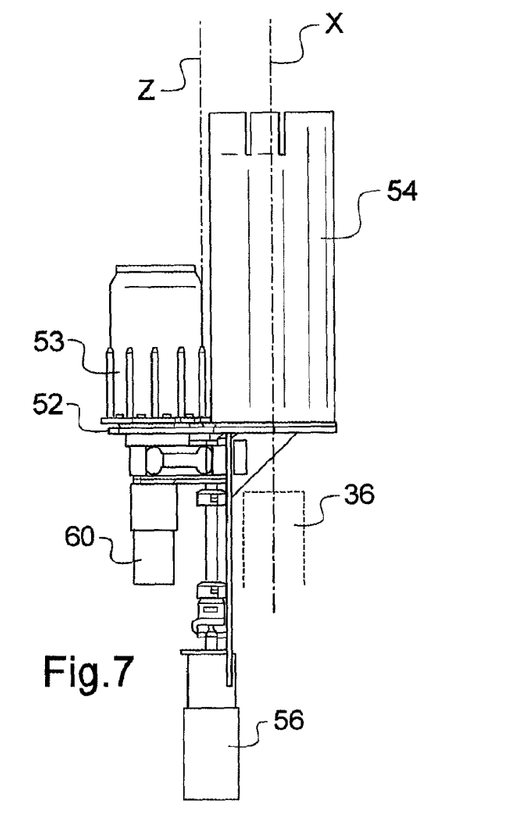

FIGS. 6 and 7 illustrate more particularly the insertion zone 8 of the waste items. Said insertion zone comprises a liquid catchment 51, fixed and accessible from the opening 7 made in the front face 5 of the machine 1. The liquid catchment 51 is intended to receive the liquid contents of the waste items. The liquid collected is poured into a sealed tank situated for example in the pedestal 31 or in an evacuation conduit. The catchment 51 enables the user to empty the liquid contained in the waste item prior to being collected, in order to avoid befouling the waste container.

The waste item is deposited by the user on a waste support 53 disposed in the insertion zone 8 and accessible through the opening 7. The waste support 53 is integral with a carousel 52 mounted pivotally around a vertical axis Z with respect to the mounting plate 30 and which can be actuated by means of a carousel motor 56. After insertion of a waste item and recognition thereof, the carousel 52 pivots one half-turn to move the waste item to face the platform 36, which is in the lower position. An opening (not shown) made in the waste support 53 allows the passage of the platform 36 and of the slide 37 through the waste support to take the waste item towards the sorter 40.

The carousel 52 also comprises a protective housing 54, which extends diametrically opposite the waste support 53. When the carousel has pivoted to take the waste item to face the platform 36, the protective housing 54 replaces the waste support in the insertion zone to prevent access to the machine by the user.

Once the waste item has been taken by the sorter 40, the platform 36 returns to its lower position and the carousel 52 pivots to place the waste support 53 again in the insertion zone 8.

The machine also comprises an automatic motor control system, and a computer. Said control means make it possible to control the motors, to process the information from the different sensors; they contain and execute the shape recognition program and ensure the operation of the machine 1.

Figure 8:
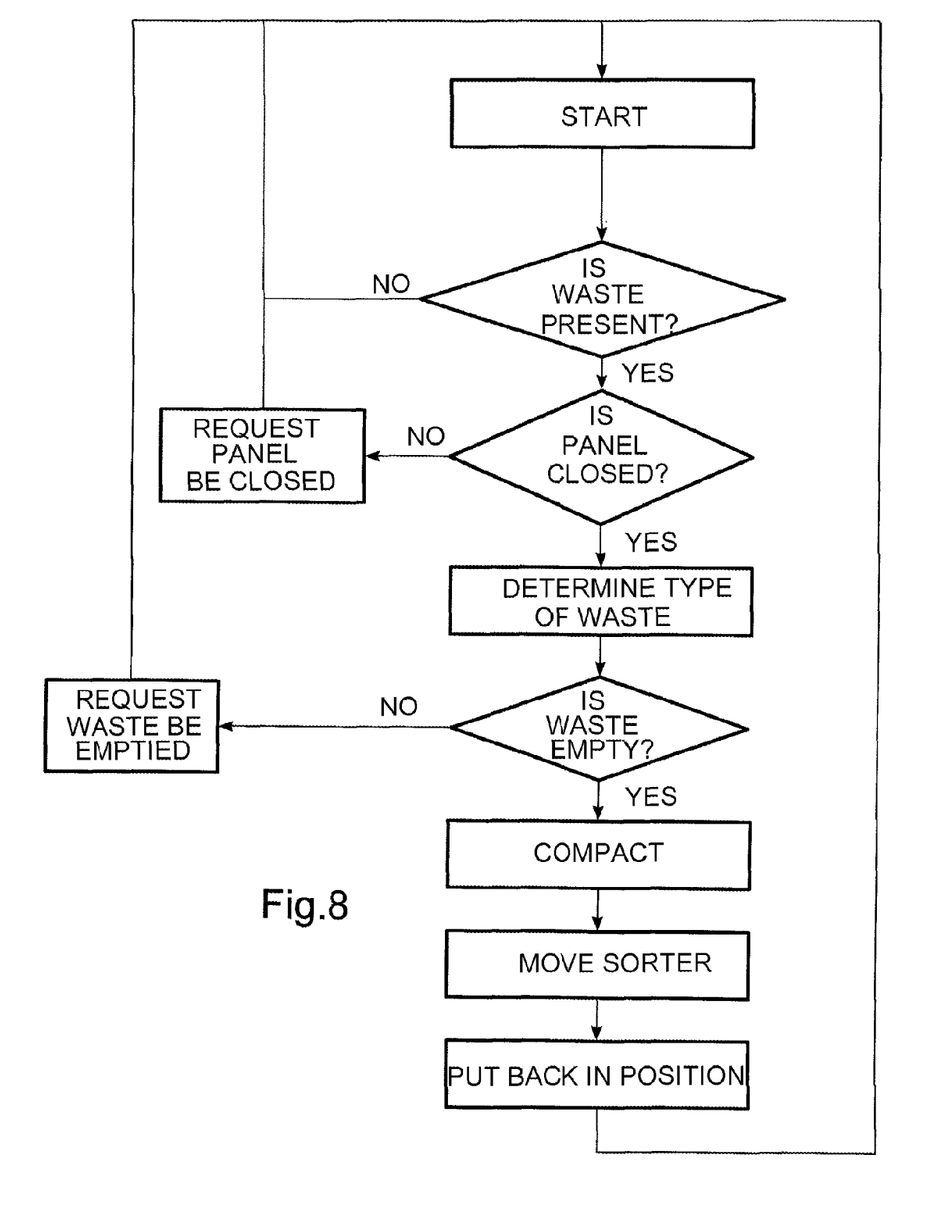
FIGS. 8 and 9 are respectively operational flowcharts of the machine illustrated in FIGS. 1 to 7.

FIG. 8 is an operational flowchart of the machine 1, which is implemented in the following manner: the user opens the sliding trapdoor situated on the front face 5 and deposits a waste item such as a metal can on the waste support 53, then re-closes the sliding trapdoor. The machine 1 then analyzes the waste item. The camera 50 takes images of the waste item and the shape recognition program determines the type of waste item present by shape recognition, comparing it to a database of recyclable waste items. If the waste item is not listed in the database, a message on the screen 9 tells the user to remove the waste item. If the waste item is known in the database, the machine determines in which container it will be stored (see description of the operation of the storage zone below).

A scale built into the carousel 52 measures the weight of the waste item and compares it to the weight of the empty waste item as defined in the waste item database, in order to determine whether or not the waste item still contains liquid.

If the waste item is not empty, a message displayed on the screen 9 asks the user to empty the waste item into the liquid catchment 51. If the waste item is empty, the carousel 52 pivots one half-turn to take the waste item into the axis of the platform 36.

The control means then actuate the motor 39 of the elevator device 15 in order to raise the platform 36. The waste item is moved with the platform 36 and is engaged in the guide 13 by means of the cone, which makes it possible to keep the waste item vertical. At the end of travel of the platform 36, the waste item is crushed against the stop 34.

The platform 36 descends back down to the level of the transfer plate 45 so that the disk 35 is flush therewith. The receptacle 41 and the movable plate 46 are then moved to take the waste item above the respective container 20a . . . 20d.

The platform 36 descends back down, the receptacle 41 resumes its initial position and the carousel 52 is pivoted to place the waste support 53 in the insertion zone 8.

Figure 9:
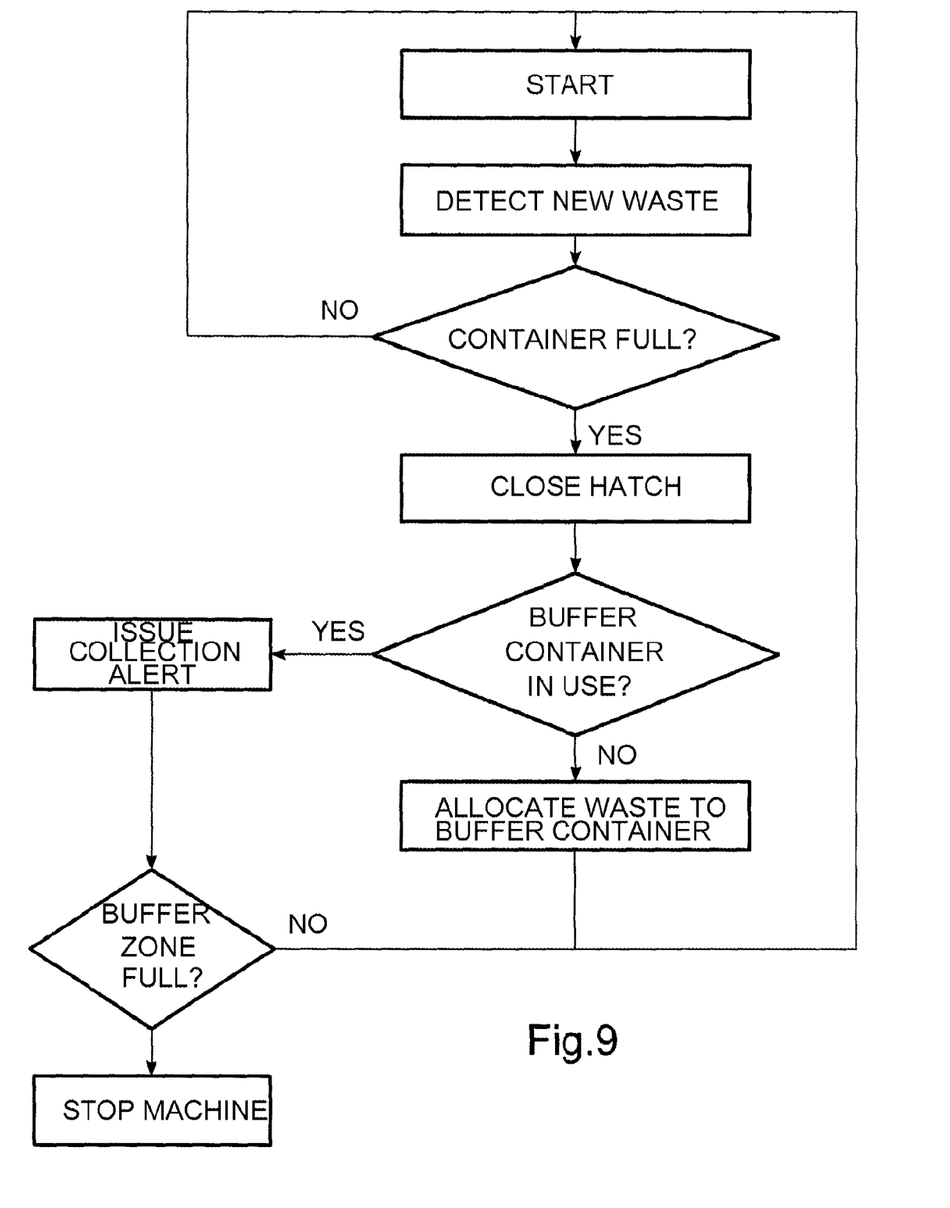

FIG. 9 illustrates an operational flowchart of the waste storage zone, and in particular the management of the containers 20 when one of them is full.

The filling of the containers is continuously monitored so that when a container is full, the corresponding trapdoor 22 is closed. Subsequent waste items are diverted to the buffer container 21 while the machine 1 issues a maintenance alert in order to signal that one of the containers is full.

If a new container also becomes full and the buffer container is already being used, the device closes the trapdoor 22 of the corresponding container and the waste items are then stored in the temporary storage volume 23 pertaining to the container.

If at least one of the temporary storage volumes 23 becomes full, the machine 1 stops in order to prevent an overflow of waste.

Of course, the invention is not limited to the arrangements and functions described above.

In particular, the machine can comprise more or fewer than four containers. The sorter 40 will then be adapted to include as many positions as there are containers.

The use of a camera 50 for shape recognition of the waste items is particularly advantageous, because this means of sorting waste makes it possible to reject non-recyclable waste items. The sorting means can also comprise a barcode reader to make it possible to identify the nature of the packaging. Thus, it is possible to distinguish a cola can from another carbonated beverage, even though the shapes of the cans are identical. It is then possible to determine the recycling rate for a given product or brand. The barcode reader is advantageously associated with a rotation device 60 (FIGS. 6 and 7) with which the waste support 53 of the carousel 52 is equipped, enabling the waste item to be rotated. Thus, it is possible to scan the entire surface of the waste item in order to detect the barcode.

The movement of the platform 36 in this instance is provided by a rod/crank system actuating a slide 37. Other lifting means can be considered, such as hydraulic, pneumatic or electric cylinders or screw systems directly supporting the platform 36.

Similarly, the sorter 40 uses a system of cams 48 and contactor 49 to control the position of the receptacle 41 and of the movable plate 46. Other control systems can be considered, such as stepper motors driving the receptacle 41 and the movable plate 46, or reed switches.

Figure 10:
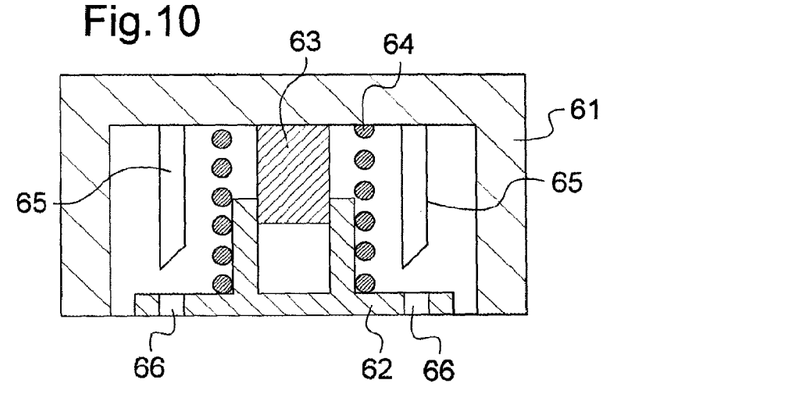
FIG. 10 illustrates a side view in cross-section of a compaction stop shown in FIGS. 2 and 3.

According to a variant of embodiment of the stop 34 illustrated in FIG. 10, the stop 34 comprises a rigid annular housing 61. The stop 34 also comprises a movable anvil 62, which slides on a guide 63 against an ejector spring 64 that holds the anvil away from the bottom of the housing 61.

The stop 34 further comprises points 65 to pierce the waste item in order to prevent it from bursting during compaction. The anvil 62 is arranged to allow the points 65 to pass through it by means of orifices 66 made in the anvil 62 directly over the points 65.

Thus, when the platform 36 crushes the waste item against the stop 34, the anvil 62 moves towards the bottom of the stop 34, allowing the points 65 to appear. While continuing its travel, the platform 36 crushes the waste item against the anvil 62 that has reached the stop and allows the points 35 to pierce the waste item. The platform 36 then descends again to the level of the plate and the ejection spring 64 pushes the anvil 62 in order to release the waste item from the points 65. The waste item then falls into the receptacle 41, which can then move it to the appropriate container 20. The piercing makes it possible to accept bottles that are closed with a cap. Moreover, the shape of the stop and of the platform are planned in such a way as to cause a plastic and permanent deformation of the waste items, with no elastic return of amplitude, so that the waste item remains compacted.

Alternatively, the stop 34 can be directly integral with the receptacle 41 in the form of a single rigid bottom.

The sensors of the storage means can be advantageously replaced by a waste item counter. By first establishing the volume of each type of waste and by counting the waste items stored, it is therefore possible to determine when a container is full.

The principle of ecological recycling means that the collection of waste must be done as infrequently as possible in order to reduce as much as possible the $CO_2$ emissions related to transport. Therefore, it is particularly advantageous to provide the device with communication means allowing an operator to be alerted when the containers are full. Thus, the operator travels only if the containers are full.

To that end, the device comprises wired or wireless communication means. The device can therefore be connected to a computerized network by a wave connection [sic] such as Wi-Fi, GPRS, etc.

Said remote communication means can also be used for remote maintenance and to enable the device to generate malfunction alerts.

The invention claimed is:

1. A machine for collecting and sorting waste items, the machine comprising a frame with a base resting on the floor and a front face having an opening formed therein giving access to a waste insertion zone, the machine further comprising, inside the frame, waste-recognition means for recognizing the waste items, a waste sorter, and storage means for storing sorted waste items and comprising at least two containers,
   the machine comprises an elevator for transporting a waste item on a platform, inserted into the waste insertion zone towards the sorter disposed vertically above the waste insertion zone; and
   the waste sorter being arranged to move the transported waste item vertically above a container selected according to information delivered by the waste-recognition means and in which the waste item is received,
   the sorter comprising a stationary transfer plate comprising an orifice enabling the platform to bring the waste item up to the height of the transfer plate in a first position, and first movement means for moving the waste item on the transfer plate between the first position and at least two distinct positions in which the waste item is taken beyond an end of the transfer plate vertically above the corresponding container.

2. The machine according to claim 1, wherein the elevator comprises:
   the platform movable between a lower position and an upper position, and arranged in the lower position to receive the waste item in the waste insertion zone and in the upper position to bring the waste item into the sorter and,
   a second movement means for moving the platform between the lower position and the upper position.

3. The machine according to claim 2, comprising a movable waste item support for receiving the waste item, and a third movement means for moving the waste support between a first position in which the movable waste support is disposed in the waste insertion zone close to the opening in order to receive the waste item inserted by a user, and a second position enabling the platform to take the waste item contained in the waste support.

4. The machine according to claim 3, wherein the third movement means comprises a carousel mounted to pivot about a vertical axis and carrying a protective housing, the carousel being arranged so that the protective housing blocks the waste insertion zone while the waste support is in the second position.

5. The machine according to claim 1, wherein the waste insertion zone comprises a liquid receiver.

6. The machine according to claim 1, wherein the waste insertion zone comprises means for verifying that the waste item is empty.

7. The machine according to claim 1, wherein the first movement means comprises a receptacle mounted to pivot parallel to the transfer plate and surrounding the waste item to move the waste item on the transfer plate.

8. The machine according to claim 7, wherein the sorter includes a horizontal movable plate that pivots parallel to the transfer plate, the movable plate moving between a first position in which the movable plate extends one end of the transfer plate to extend the transfer plate and enable the waste item to be moved on the movable plate (46), and a second position in which the movable plate (46) is spaced apart from the end of the transfer plate.

9. The machine according to claim 2, comprising a stop disposed above the sorter and against which the platform crushes the waste item.

10. The machine according to claim 8, wherein the stop comprises means for piercing the waste item and for ejecting the waste item from the stop.

11. The machine according to claim 7, wherein the receptacle comprises a bottom stop on which the platform crushes the waste item.

12. The machine according to claim 1, wherein the storage means comprise trapdoors for closing each container and separating each container from a buffer zone situated above the corresponding trapdoor.

13. The machine according to claim 1, wherein the storage means comprises at least one buffer container enabling waste to be stored when at least one other container is full.

14. The machine according to claim 1, wherein the waste-recognition means comprises a camera coupled to a shape-recognition program.

15. The machine according to claim 14, wherein, in order to recognize the waste item, the shape-recognition program estimates a ratio between a height of the waste item and a diameter of the waste item.

16. The machine according to claim 1, wherein the waste-recognition means comprises a bar code reader.

17. A machine for collecting and sorting waste items, the machine comprising:
   a structure having a base resting on the floor and a front face having an opening providing access to a waste item insertion zone; and
   inside the structure are:
      a waste item recognition device, a waste item sorter, and storage for sorted waste items comprising containers; and
      an elevator for transporting on a platform the waste item introduced into the insertion zone towards the waste item sorter that is arranged above the insertion zone;
   the waste item sorter is arranged to move the transported waste item to a location above one of the containers that is selected as a function of information delivered by the waste item recognition device and in which the waste item is received,
   the waste item sorter comprises a stationary transfer plate having an orifice through which the platform elevates the waste item up to the height of the transfer plate in a first position, and a movable receptacle to move the elevated waste item between the first position and at least two distinct other positions in which the elevated waste item is taken beyond an end of the transfer plate to above the selected container.

18. The machine for collecting and sorting waste item according to claim 17, wherein the first position and the at least two distinct other positions are located at a same radial distance from a common center point and wherein the movable receptacle rotates about the center point.

* * * * *